United States Patent [19]
Bolduc

[11] Patent Number: 5,553,684
[45] Date of Patent: Sep. 10, 1996

[54] SINGLE-UNIT SYSTEM FOR CONTROLLING VEHICLE ACCELERATION AND BRAKING

[76] Inventor: Scott A. Bolduc, 1284 Ashland Dr., Baton Rouge, La. 70806

[21] Appl. No.: 298,207

[22] Filed: Aug. 29, 1994

[51] Int. Cl.⁶ .................................................. B60K 26/00
[52] U.S. Cl. ........................................ 180/333; 180/321
[58] Field of Search .................................. 180/333, 315, 180/320, 321, 324

[56] References Cited

U.S. PATENT DOCUMENTS

| | | | |
|---|---|---|---|
| 4,476,954 | 10/1984 | Johnson et al. | 180/333 |
| 4,722,416 | 2/1988 | Ahnafield | 180/333 |
| 5,086,870 | 2/1992 | Bolduc | 180/333 |
| 5,131,483 | 7/1992 | Parkes | 180/333 |
| 5,261,291 | 11/1993 | Schoch et al. | 180/333 |
| 5,280,282 | 1/1994 | Nagafusa et al. | 180/321 |

*Primary Examiner*—Karin L. Tyson
*Attorney, Agent, or Firm*—Chris A. Caseiro; Thomas L. Bohan

[57] ABSTRACT

A remotely-controlled system for the operation of the gas and brake pedals of a vehicle wherein a limited physical input is translated into desired vehicle acceleration and braking. A single joystick lever is linked electronically to mechanical components connected to the gas and brake pedals so as to operate those pedals in a fly-by-wire manner. The joystick lever is optionally tied to a feedback mechanism that permits the driver to adjust the resistance felt upon movement of the lever. In that way, the feel for the vehicle's operation can be experienced more readily. The control system of the present invention permits able-bodied operation of the vehicle without any interference.

5 Claims, 3 Drawing Sheets

SINGLE-UNIT SYSTEM FOR CONTROLLING VEHICLE ACCELERATION AND BRAKING

BACKGROUND OF THE INVENTION

1. Field of the Invention

This invention relates to devices and systems for permitting the operation of a vehicle by a physically-impaired person. More particularly, the present invention relates to systems for controlling, through a single unit the acceleration and braking functions of a conventional vehicle. Still more particularly, the present invention relates to a system having a single control component through which the accelerator and brake of the vehicle are operable by hand while permitting standard operation of the vehicle by an able-bodied person. The system of the present invention includes means for enhancing response sensitivity.

2. Description of the Prior Art

In the past there have been developed a number of systems designed to assist the physically disabled to operate as "normal" a life as possible. More recent systems have been designed to permit such an individual to be self-sufficient. One key type of system for enabling such self-sufficiency relates to the operation of motor vehicles. In particular, there have been created either vehicles specifically adapted for use by physically-impaired individuals, or devices for adapting a standard vehicle for use by physically-impaired individuals. Of course, the custom-made vehicles are limited to use by a physically-impaired person, generally cannot be operated by an able-bodied person without the extensive training required by the vehicle owner, and they are much more expensive than standard vehicles. The devices available and made for adapting a standard vehicle to special use vary widely and impose their own limitations.

As noted in an earlier patent of the present applicant, U.S. Pat. No. 5,086,870 entitled "Joystick-Operated Driving System" (hereinafter the Bolduc patent), there are several hundred thousand Americans who are paraplegic or quadriplegic (i.e., suffer from restricted motion and strength in one or more limbs of the body) and who cannot simply step into their automobiles and drive away. For these individuals the production-line automobile does not provide the mobility most take for granted. Devices adaptable to production vehicles for use by impaired individuals have been somewhat successful.

One such device is the control system of Ahnafield (U.S. Pat. No. 4,722,416). Ahnafield describes the use of hydraulic cylinders for operating the steering, acceleration and braking of a vehicle. Control of all of the hydraulic cylinders is achieved through the operation of a remote manipulator and the hydraulic pressure used in the cylinders is delivered by the vehicle's own hydraulic pump. The remote manipulator described by Ahnafield comprises a single joystick of the type well known in the field of motorized wheelchairs. Such manipulators provide two axes of motion wherein side-to-side motion is translated into left and right turns, and forward and backward motion are translated into acceleration and braking.

Another type of control device apparently adaptable to production-line vehicles is the one disclosed by Johnson et al. (U.S. Pat. No. 4,476,954). This device also operates by means of a single joystick, similar to the one described by Ahnafield. The joystick of the Johnson system controls input to DC motors which are then used to rotate the steering wheel and to depress the accelerator and brake pedals. In particular, the joystick has a range of motion that approximates the range of motion of an airplane joystick. Although the use of such a joystick for controlling a vehicle is of particular interest to the physically-impaired individual, such a range of motion may limit the usage of the Johnson device to those individuals with the dexterity to reach and maintain full extension as the driving situation dictates. More recent systems providing similar capabilities include the devices described by Chuang (U.S. Pat. No. 5,228,356) and Schoch et al. (U.S. Pat. No. 5,261,291).

As previously noted in the prior patent of the present applicant, the noted adaptable devices utilizing a joystick method of operating a vehicle all fail in one particular aspect: they do not fully address the needs of the physically-impaired individual. Although such individuals have physical deficiencies, they respond to driving stimuli utilizing the same mental processes as fully-functional individuals. In order to provide vehicle access to all but the most severely impaired, there must be a control system which translates the limited movement and strength of the individual into commands that direct the vehicle to operate as a function of the mental process rather than the physical process. To do so, the translation from electronic input, initiated by the physically-impaired individual, to operation of the vehicle must be as smooth as the translation from the brain to the hands and feet of the normal individual. It is also necessary in such a system to permit control of the vehicle in the event of catastrophic failure of the control system. It was further noted that such an adaptation system should provide for fast and simple conversion of the unitary mode of control to a conventional able-bodied mode of control.

The system described in the Bolduc patent achieved the noted goals. However, that system was directed to enabling even the most severely disabled individual to operate a standard vehicle. While that system is relatively simple in comparison to prior devices, and in comparison to a customized vehicle, it is nevertheless, more than is required for the individual with something more than an extremely limited range of physical capabilities. That is, the person who may have complete upper body control but little or no lower body control, or at least some sort of limitation preventing full use of one or both legs. That person can operate the steering wheel of a conventional vehicle but cannot operate the accelerator and brake. The single-unit operating system for such a person interferes with the ability to move the conventional steering wheel, and includes equipment and control subsystems that are otherwise unnecessary. As a result, the applicant created a single-element device to be used in controlling only the accelerator and the brake of a conventional vehicle.

Earlier devices created to provide manual means for operating the accelerator and brake of a vehicle have been described by Conlyn, Jr. et al. (U.S. Pat. No. 4,946,013), Ulrich (U.S. Pat. No. 4,788,879), and Howell (U.S. Pat. No. 4,993,509). The device disclosed by Conlyn is a relatively simple mechanical system having a handle joined to a brake actuator and an accelerator actuator. As applied, the Conlyn device interferes with standard operation of the vehicle by an able-bodied person. In addition, the device fails to provide feedback sensitivity to allow smooth control of the brake and accelerator. The Ulrich device has two separate but linked handles, one for regulation of the accelerator and the other for the brake. The Ulrich device fails to provide ready access to the brake and gas pedals and does not offer feedback means that would give the driver a "feel" for the vehicle's operation. The system disclosed by Howell also permits manual operation of the gas and brake. However, as with the other earlier devices, it is a simple combination of mechanical linkages offering no easy access by able-bodied drivers and no feel for vehicle operation. Moreover, the Howell device is connected to the steering wheel, further limiting accessibility.

It has been observed that prior-art systems apparently available for manual operation of the accelerator and brake pedals of a vehicle involve the use of essentially entirely mechanical or hydraulic linkages. That is, the input from the driver is coupled to a mechanical element that in turn controls mechanical components coupled to the accelerator and brake. However, such systems fail to take into account the constantly adapting evaluations of the driver as the vehicle is being operated. The prior mechanical and hydraulic linkages simply cannot respond quickly enough or adequately enough to the driver's actions carried out under normal thought processes while in a driving situation. Moreover, they fail to make the input device adjustable so that the "feel" of the input means can be set to a particular person's capabilities. Current devices all provide a single type of feedback in the input device, regardless of the driver's needs.

The present applicant has created a manually-operated gas/brake system that overcomes several deficiencies associated with the prior devices. That system leaves the vehicle pedals free for able-bodied use even with the system installed. The brake pedal is controlled through a direct mechanical brake applicator means that includes an arm with a roller that, as it rotates, applies pressure to the brake pedal and/or its linkage. This is achieved either by connection of a cable directly to the pedal. Alternatively, the brake applicator means may include, but is not limited to, the use of gears, pulleys, belts, levers, linear ball screws, and linear motors. The accelerator is applied through accelerator application means such as by reversing the rotation of the roller at the brake disc, wherein a cable pulls a lever which either pushes or pulls the accelerator linkage. Alternatively, accelerator application means may include, but is not limited to, the use of a direct cable attachment, levers, pulleys, belts, or a second separate motor operating in a linear or rotational manner.

In the preferred embodiment of the previously developed system, control is provided through a single-axis joystick tied to the brake and accelerator application means. Other input means include rotational, linear, force, and optical devices all tied to a controller that translates input into mechanical motion of the brake and accelerator pedals. As noted in the Bolduc patent, it is necessary to accommodate the physical impairment throughout the entire control system. In particular, it is necessary to provide a response to joystick operation which accounts for the acceleration and braking patterns which are most natural for the human brain. This is achieved through the use of a joystick with a small range of motion, a joystick-interfacing design which permits "digitized" acceleration and braking control, backup control systems and mechanical components that provide a smooth transition from a limited physical input to a desired vehicle movement.

While the system described in the Bolduc patent addressed many of the failings in the prior complete single-control-unit operating devices, as earlier noted, it nevertheless is directed to assisting those persons who are essentially entirely handicapped. That is, it provides for operation of the accelerator, brake and steering via the single joystick. The system also requires some skilled effort in order to make the vehicle conventionally operable-not as much effort as the earlier similar devices-but particular technical knowledge is needed. For these reasons, the system is fairly expensive, particularly for the individual who has the capability to operate the steering wheel and therefore does not need that portion of the prior Bolduc device that includes such operation. Another limitation of the prior Bolduc system is the inability to adjust the tension of the control unit so that operator sensitivity and a feel for the way the device moves the vehicle are realized. This is a deficiency in all manual control accelerator/brake control units available.

Therefore, what is needed is a control device for the operation of a vehicle's accelerator and brake pedals by a physically-impaired individual that provides a means by which the normal thought processes used in accelerating and braking can be implemented smoothly regardless of the operator's gross physical condition. What is also needed is a control device for the operation of a vehicle's accelerator and brake pedals that is simple to install and operate and that leaves the motor vehicle fully operable for any non-impaired driver. Still further, what is needed is a control device for the operation of a vehicle's accelerator and brake pedals that includes means for adjusting the response of the input device to fill the needs of a particular driver.

SUMMARY OF THE INVENTION

It is an object of the present invention to provide a control device for the operation of the accelerator and brake pedals of a motor vehicle by a physically-impaired individual without preventing operation of the vehicle by an able-bodied person. It is also an object of the present invention to provide a control device for the operation of a vehicle's accelerator and brake pedals that takes into account and that can adjust for the typical driver input normally involved pursuant to the thought processes associated with driving a vehicle. In addition, it is an object of the present invention to provide such a control device that includes means for customizing the feel of the input component of the system to accommodate a particular driver.

These and other objectives are achieved in the present invention by the introduction of a fly-by-wire controller coupling a unitary control mechanism, such as a joystick, with mechanical linkages affixed directly to the accelerator and brake pedals. The control system of the present invention includes control means for translating physical movement of the joystick into electrical signals that are in turn translated into movement of one or more mechanical elements connected to the accelerator and brake pedals.

An input signal received from the unitary control mechanism of the present invention is analyzed by a controller, including one or more microprocessors, which in turn provides an output signal to drive means controllers corresponding to mechanical means such as a stepper motor, attached cables, pulleys, or linear or rotational motors. The drive means controllers in turn convert these signals into motion information for the mechanical means of the system. The drive controllers control the direction of motion and speed of the mechanical means by translating low level control signals from the microprocessors into the required voltage and current levels to obtain the power needed at the mechanical devices to achieve the desired movement of the accelerator and/or brake pedals. The utilization of a combination of fly-by-wire control means and fine-controlled mechanical devices in the present invention permits translation of a small joystick range of motion into thousands of discrete and repeatable locations of accelerator/brake positions, thereby closely tracking a driver's thought processes while operating the vehicle. This is all achieved in the present invention through the use of a device that can be "disengaged" from the vehicle's control surfaces simply with the flip of a switch. All mechanical attachments to the pedals are kept out of the way of where an able-bodied driver's feet would be positioned for manipulation of those pedals.

A key feature of the present invention relates to the interface between the driver and the control device used to provide electrical signals to the mechanical drive controllers. Specifically, the present invention includes means for adjusting the level of input required for the driver to move the joystick or other input control mechanism in order to effect movement of the gas pedal, brake pedal, or both. The forced feedback means preferably includes two feedback arms coupled to the single joystick. Each feedback arm includes an upper portion linked to the joystick and a lower portion the position of which may be changed. By changing the position of the lower portion of each feedback arm, the resistance experienced by the driver as the joystick is moved, can be varied. For example, in one position, the resistance is linear throughout the entire stroke of the stick. In another position the resistance increases at first and then decreases as the joystick moves toward full swing. In a third orientation, the resistance continues to increase throughout the full swing of the joystick. In this way, those drivers having less "feel" than other drivers can nevertheless receive feedback that signifies desired movement of the joystick. Fine tuning of the feel is further provided in the present invention by including, as part of the feedback arms, spring elements that are also adjustable. In addition, the spring elements may be hydraulic so as to provide a dampening effect that results in smoother transition during acceleration and braking-the type of smooth transition observed during able-bodied driving.

These and other advantages of the present invention will become apparent upon review of the following description, the drawings, and the appended claims.

DETAILED DESCRIPTION OF THE PREFERRED EMBODIMENT

Figure 1:
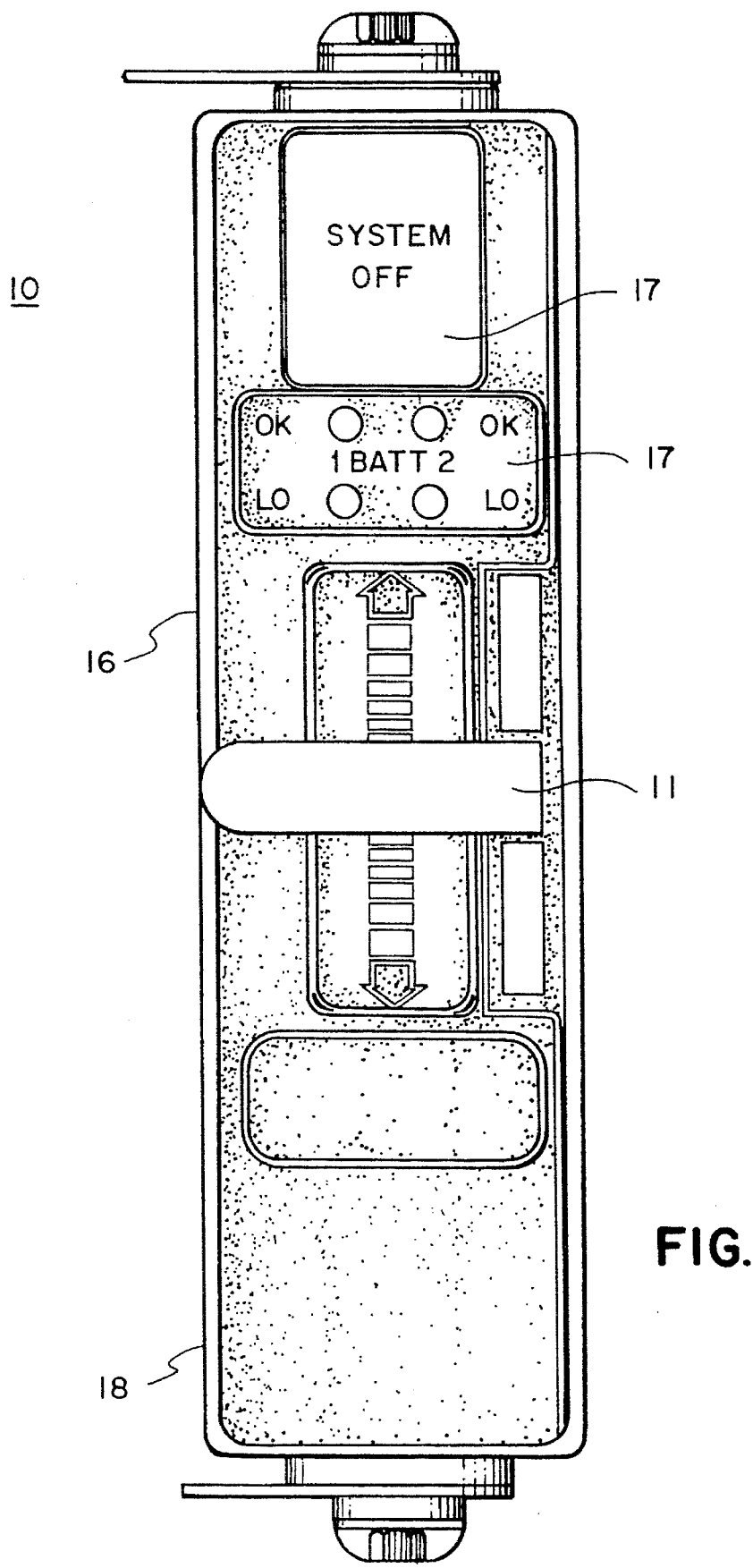
FIG. 1 is a simplified top view of the controller housing of the control device of the present invention.

As illustrated in FIGS. 1–4, a control unit 10 of a control device of the present invention includes a joystick lever 11 used to control the movement of a gas pedal 12 and a brake pedal 13 of a vehicle. It is to be understood that the vehicle is of any type having acceleration means and braking means. To accommodate the physical limitations of a physically-impaired individual, the operation of the vehicle can be achieved through minimal physical movement. The joystick lever 11 shown in FIG. 1 is oriented such that movement along one plane, e.g., left to right and vice-versa, produces electronic signals directed to a gas/brake servo motor 14 connected to the brake pedal 13. However, it is to be understood that alternative movement orientations may be included without deviating from the basic function of the control device. The motion of the joystick lever 11 transmits a signal to a central processing unit which, in turn, directs a power supply/drive unit to command an acceleration/braking assembly 15 to operate the gas pedal 12 and the braking pedal 13. To power the present invention, the standard operating system of the vehicle can be used, including the 12-Volt battery normally supplied therewith. A back-up power supply may be included as a redundant feature.

As illustrated in FIG. 1, the control device of the present invention includes a housing 16 that contains the joystick lever 11. The housing 16 also includes a system display unit 17 which informs the vehicle operator of the operational status of the system at any given time. The joystick lever 11 is linked to a central processing unit via a primary interface cable 18. The primary cable 18 transmits command signals from the central processing unit to the display unit 17 and transmits input signals from the joystick lever 11 to the central processing unit. All wiring which interfaces with the central processing unit is internally harnessed, uses latching-type headers, is strain relieved and is protected from chaffing, all so as to provide reliability and multiple redundancy.

The interface between the joystick lever 11 and the braking and steering mechanisms of the vehicle, is controlled through the central processing unit. The central processing unit contains the circuitry to initiate use of the system as well as the microprocessors that control the electronic/mechanical interfacing of the driver inputs and vehicle operation, all of which sub-systems are well known within the industry. Four levels of electronics are all contained within the central processing unit. These four levels correspond to: (1) initialization of the joystick-control of the vehicle and sensing vehicle status; (2) control of vehicle motion; (3) perform input and output functions; and (4) perform self-checks to evaluate control reliability. Through this command system mechanical functions of the present invention can be varied to meet the needs of the particular vehicle operator.

To incorporate the digital action/reaction process of the physically-impaired vehicle driver, the joystick lever 11 of the present invention is constructed using a direct-drive potentiometer to provide the desired mechanical/electronic interface. In particular, the joystick lever 11 operates such that a front-to-back movement of the lever 11, utilizing a high-reliability potentiometer, controls acceleration and braking functions. The potentiometer translates mechanical movement of the joystick lever 11 into an electrical signal delivered to the central processing unit. A voltage converter in turn converts the potentiometer signal into an acceleration/deceleration voltage signal. An acceleration/deceleration circuit means, which may be a simple circuit or a microprocessor, compares the output from the acceleration voltage signal with the output from a servo position sensor coupled to the gas/brake servo motor 14, which includes an encoder that effectively closes the loop between acceleration/deceleration input and output at the gas pedal 12 and brake pedal 13. The acceleration/deceleration circuit transmits a second electronic signal to a drive controller. The drive controller in turn transmits a signal through a gas/brake cable 22 to the gas/brake servo motor 14 located within the acceleration/braking assembly 15 of the present invention.

Figure 2:
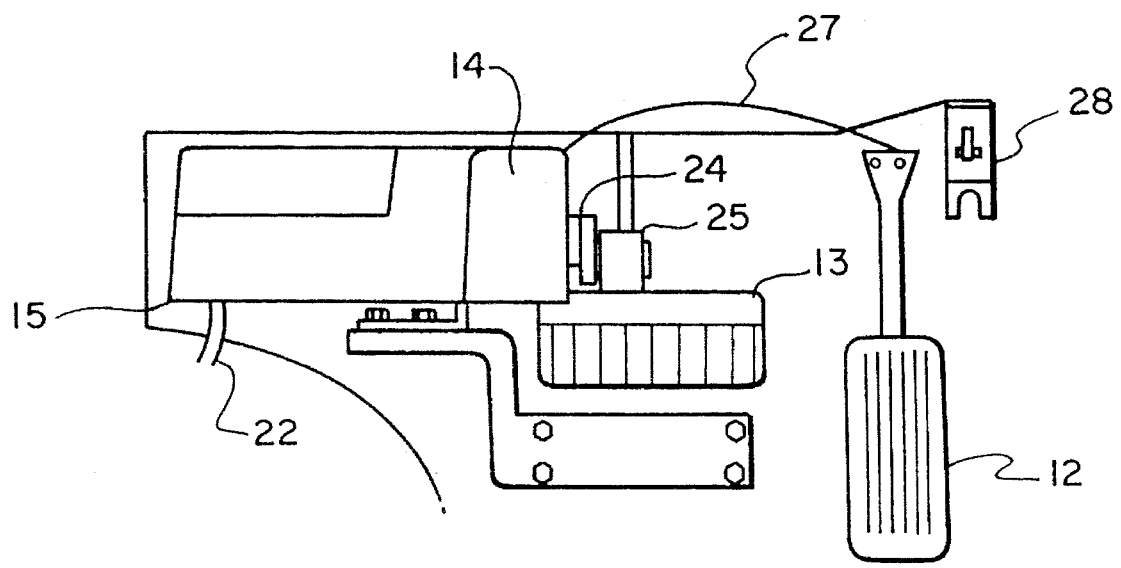
FIG. 2 is a front view of the gas/brake linkage subsystem of the control device of the present invention.
Figure 3:
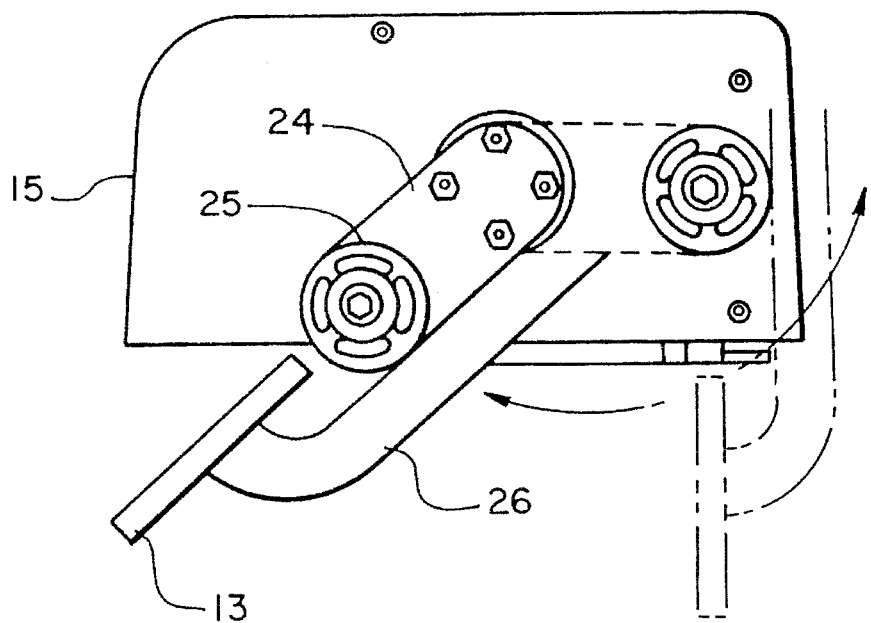
FIG. 3 is a side view of the gas/brake linkage subsystem of the control device of the present invention.

As illustrated in FIGS. 2 and 3, the servo motor 14 is connected to and operates the gas pedal 12 and the brake pedal 13 which remain fixed in their common location within the driver's space of the vehicle. The servo motor 14 is attached to the brake pedal 13 by means of a drive arm 24 which is in turn attached to a cam follower roller 25 that actually contacts a brake pedal arm 26. The cam follower roller 25 contacts the surface of the brake pedal arm 26 so as to actuate the brake pedal 13. The servo motor 14 is also connected to an acceleration cable 27, which is connected to and actuates the gas pedal 12 via an accelerator cable bracket 28.

Figure 4:
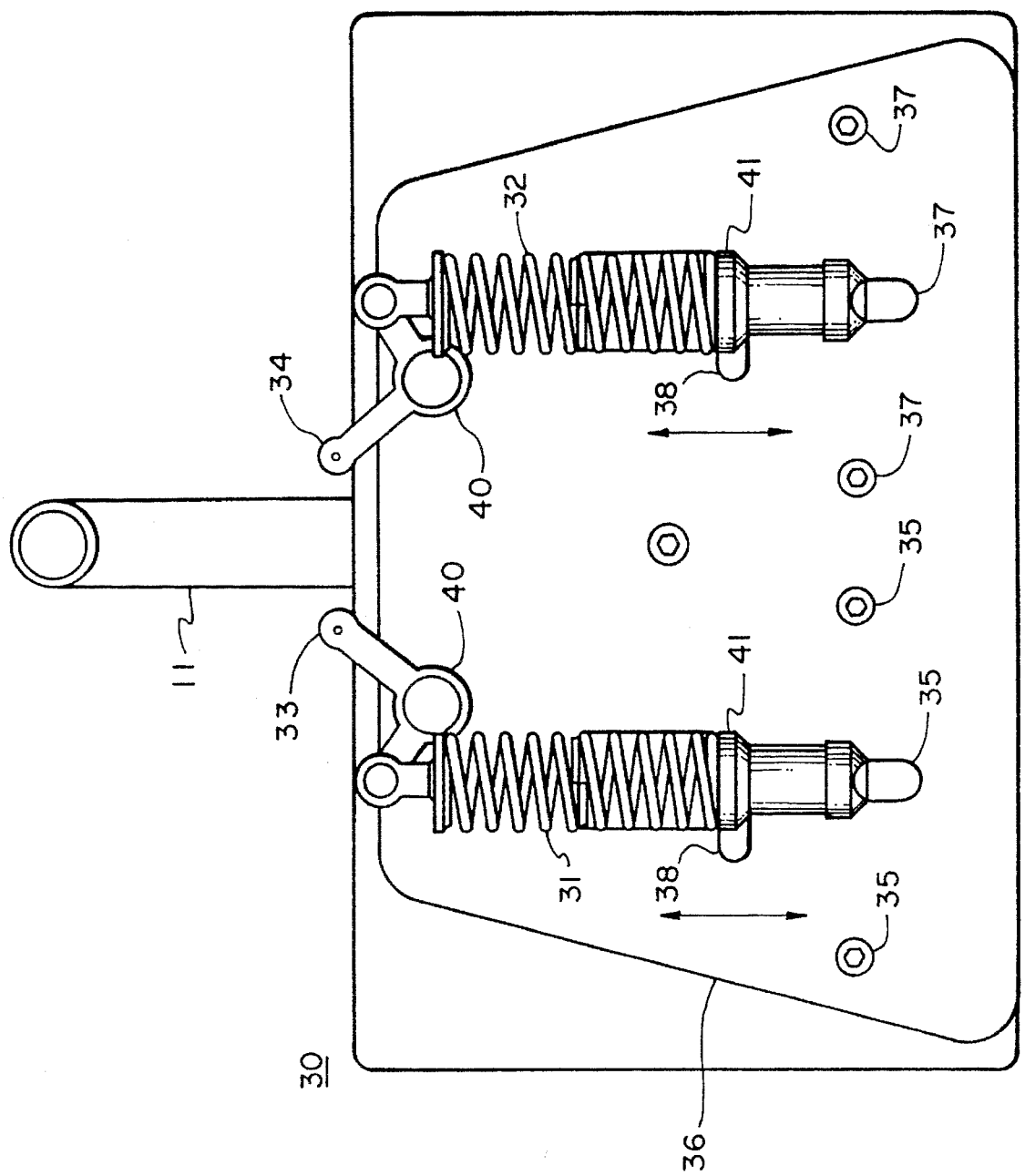
FIG. 4 is a side view of the feedback means of the control device of the present invention.

A key feature of the present invention, illustrated in FIG. 4, is the feedback device 30 coupled to the joystick lever 11. The feedback device 30 permits modification of the resistance experienced by the driver when moving the joystick lever 11. In the preferred embodiment of the present invention, the feedback device includes a first feedback arm 31 and a second feedback arm 32 separately connected to the joystick lever 11 at a first connection point 33 and a second connection point 34, respectively, through pivot arms 40. A plurality of first feedback arm lower connection positions 35 permit coupling of the first feedback arm 31 to a feedback substrate 36 such that the first feedback arm 31 may be in a first position, as illustrated, or, alternatively, in a position providing increased tension as the joystick lever 11 is moved. A plurality of second feedback arm lower connection positions 37 provides the same option for second feedback arm 32.

Further adjustment of the resistance experienced by the driver is provided by fabricating the first feedback arm 31 and the second feedback arm 32 as spring cylinder devices wherein the spring tension may be adjusted using spring tension adjuster screws 38 such that spring cylinder collars 41 may reduce or increase the dimensions of the screws 38. Dampening of the operation of the joystick lever 11 is achieved in the preferred embodiment of the present invention by including within the spring cylinder devices a hydraulic oil of a type known to those skilled in the art.

Although the preferred embodiment of the present invention has been described herein, it is to be remembered that the above description is merely illustrative. Other methods may be employed to provide a physically-impaired individual with control of a vehicle wherein the control system takes into account the human factors described herein. Accordingly, it is to be understood that the present invention is not limited to that precisely shown and described.

I claim:

1. A control device for a vehicle having an accelerator pedal and a brake pedal, said device comprising:

a. a human-interface device;
    b. an electronic servo connected to said human-interface device, wherein said electronic servo translates mechanical movement of said human-interface device into a first electronic signal;
    c. command means connected to said electronic servo, wherein said command means receives and processes said first electronic signal;
    d. an acceleration/braking assembly coupled to said command means and having a first assembly component coupled to said accelerator and a second assembly component coupled to said brake pedal of said vehicle, wherein said command means transmits to said acceleration/braking assembly a second electronic signal corresponding to said first electronic signal so as to effect movement of said gas pedal and/or said brake pedal; and
    e. feedback means connected to said human-interface device, wherein said feedback means regulates resistance to movement of said human-interface device.

2. The control device as claimed in claim 1 wherein said human-interface device includes a lever, said feedback means comprising a plurality of feedback arms connected to said lever, wherein each of said feedback arms includes biasing means for varying resistance of movement of said lever.

3. The control device as claimed in claim 2 wherein said biasing means is an adjustable spring cylinder.

4. The control device as claimed in claim 3 wherein said human interface device includes a feedback substrate, wherein each of said plurality of feedback arms includes a lower connection region, said feedback substrate comprising a plurality of connection positions for connecting said lower connection region of each of said feedback arms to said feedback substrate.

5. The control device as claimed in claim 4 wherein each of said adjustable spring cylinders is filled with a hydraulic oil.

* * * * *